United States Patent [19]

Wilson

[11] 4,093,977

[45] June 6, 1978

[54] GROUND FAULT PROTECTIVE DEVICE

[75] Inventor: John T. Wilson, Brighton Township, Beaver County, Pa.

[73] Assignee: Westinghouse Electric Corp., Pittsburgh, Pa.

[21] Appl. No.: 696,326

[22] Filed: Jun. 15, 1976

[51] Int. Cl.² ............................................. H02H 3/28
[52] U.S. Cl. ...................................... 361/44; 335/18; 361/98
[58] Field of Search ............ 317/18 D, 36 TD, 18 R, 317/33 SC, 58; 335/18; 361/44, 45, 46, 93, 98, 100, 101, 115

[56] References Cited

U.S. PATENT DOCUMENTS

| 3,440,580 | 4/1969 | Molenaar | 317/18 D X |
| 3,512,045 | 5/1970 | Tipton et al. | 361/44 |
| 3,539,866 | 11/1970 | Stevenson | 317/18 D |
| 3,737,726 | 6/1973 | Tarchalski | 317/18 D |
| 3,855,502 | 12/1974 | Pardue et al. | 317/18 D |
| 3,864,649 | 2/1975 | Doyle | 335/18 X |
| 3,898,528 | 8/1975 | Runtsch et al. | 317/18 D |
| 3,899,717 | 8/1975 | Legatti et al. | 317/18 D |

Primary Examiner—Patrick R. Salce
Attorney, Agent, or Firm—Robert E. Converse, Jr.

[57] ABSTRACT

A self-powered self-contained ground fault protective device including a current monitor, an electronic circuit for amplifying the output of the current monitor, and a relay connected to the amplifying circuit and adapted to operate whenever ground fault current through the current monitor rises above a predetermined level. The current monitor, amplifying circuit, and relay are all supported and enclosed by a molded insulating housing.

4 Claims, 3 Drawing Figures

GROUND FAULT PROTECTIVE DEVICE

BACKGROUND OF THE INVENTION

1. Field of the Invention

The invention relates to electrical apparatus, and more particularly, to apparatus for protecting electrical circuits from damage due to ground faults.

2. Description of the Prior Art

In designing circuits for the transmission and distribution of electrical power, it is customary to provide means for protecting the conductors and electrical apparatus being supplied through the conductors from overcurrent conditions. It has gradually been recognized that devices employed for overcurrent protection are not sufficient to prevent damage resulting from ground faults; that is, short circuits between one or more of the electrical conductors and objects connected directly or indirectly to ground. The amount of current which flows through a ground fault may be below the level required to operate the overcurrent protective devices. However, this ground fault current can result in high transient overvoltages throughout the system as well as arcing conditions leading to fire or explosion.

Various methods of detecting and correcting ground faults are currently being used. A current transformer is usually positioned to surround the conductors of the circuit being protected. This transformer, also referred to as a current monitor, produces an output signal upon occurrence of a ground fault condition at a point downstream from the current monitor on the circuit being protected. The monitor is usually connected to a separate device known as a sensor which includes a switching device such as a relay actuated by the output from the current monitor when a ground fault occurs. The contacts of the relay are then used to interrupt the supply of electrical power to the circuit being protected. While it is possible to obtain excellent protection from ground faults through the use of this system, it has sometimes not been included in the design of the electrical distribution systems due to the cost of providing such ground fault protection. The expense of providing and installing two separate units, combined with the complexity of routing the connecting circuitry and supplying power wiring for the relay have often resulted in the elimination of ground fault protection from some circuits. It would therefore be desirable to obtain a simply, compact, ground fault protective device for actuating a circuit interrupter which is low in cost and simple to install.

SUMMARY OF THE INVENTION

In accordance with the principles of the present invention there is provided a self-contained self-powered ground fault protective device. The device includes a current monitor, means for amplifying the output of the current monitor, switching means connected to the amplifying means which are operable upon energization by the amplifying means, and a housing of molded insulating material supporting and completely enclosing the current monitor amplifying means and switching means. The housing includes an aperture, or window, through which the conductors of the circuit being protected are passed. When ground fault current above a predetermined level flows through this circuit, the current monitor will produce an output to the amplifying means which in turn energizes the switching means and actuates a set of contacts. These contacts outputs can be used to control a circuit breaker or other circuit interrupting device to disconnect the source of electrical power to the circuit being protected. The ground fault protective device is powered entirely by the ground fault current flowing through the circuit being protected and requires no physical connection other than to an associated circuit interrupter for deenergizing the circuit being protected. Since the device is entirely self-powered and self-contained, cost and installation requirements are minimized.

BRIEF DESCRIPTION OF THE DRAWINGS

The novel and distinctive features of the invention are set forth with particularity in the appended claims. The invention, together with further objects and advantages thereof, may be best understood, however, by reference to the following description and accompanying drawings, in the several figures of which like reference characters identify like elements, and in which:

DESCRIPTION OF THE PREFERRED EMBODIMENT

Figure 1:
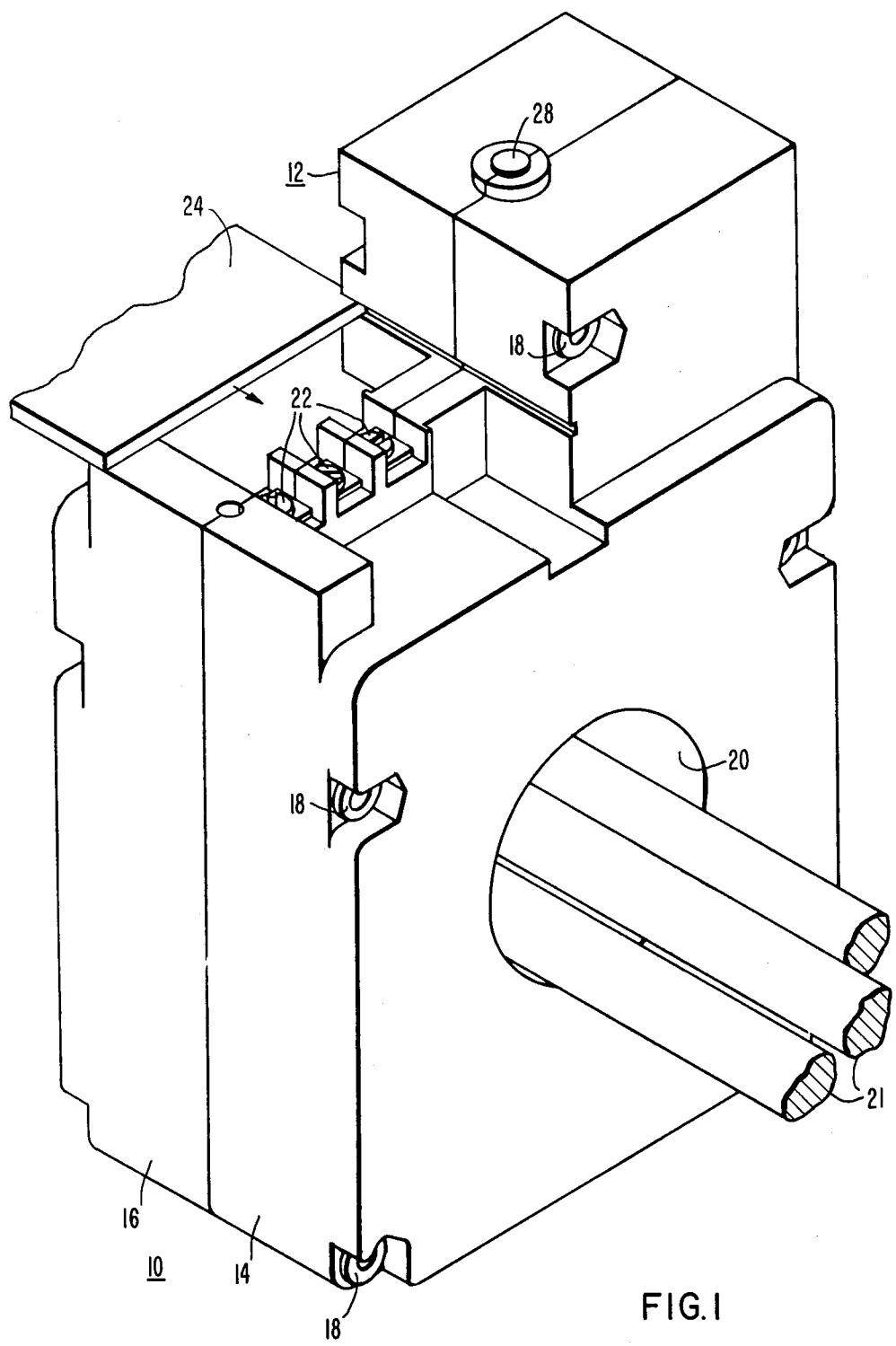
FIG. 1 is a perspective view of a ground fault protective device incorporating the principles of the present invention.

In FIG. 1 there is shown a perspective view of a ground fault protective device 10 incorporating the principles of the present invention. The device 10 includes a molded insulating housing 12 comprising a front shell 14 and a rear sheel 16 joined by fastening devices such as rivets 18. The housing 12 includes an aperture or window 20 through which the conductors 21 of the electrical circuit being protected are passed. Three terminals 22 are mounted upon the top side of the housing 12 and are protected by a removable cover 24. The terminals 22 are connected to contacts of a relay 26 shown more clearly in FIG. 2. Also extending through the top of the housing 12 is a reset indicator button 28 mechanically connected to bistable switching means such as a latching relay 26.

Figure 2:
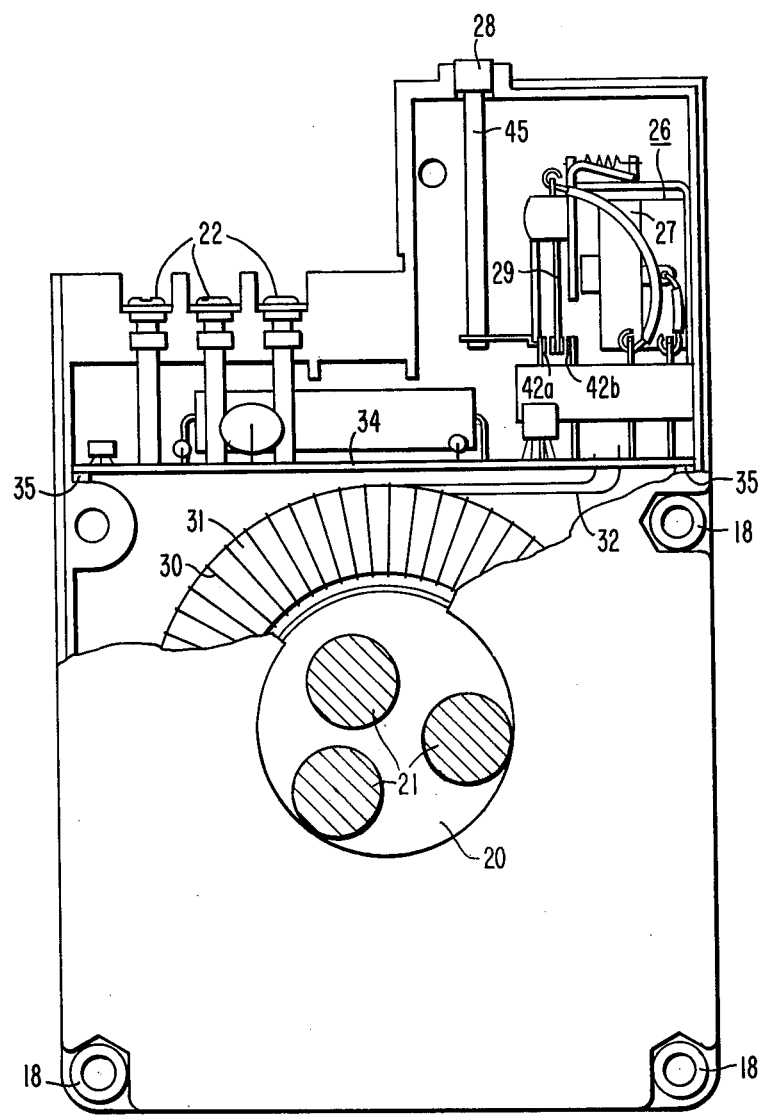
FIG. 2 is a front elevational view with parts partially cut away of the device shown in FIG. 1.

Referring now to FIG. 2 it can be seen that the aperture 20 is formed by abutting collars 28 molded into the front and rear housing portions 14 and 16. Surrounding the collars 28 is a coil 30 wound upon a core 31 composed of windings of iron tape. The coil 30 functions as the secondary of a current transformer, thereby forming a current monitor. Leads 32 are connected between the coil 30 and an electronic circuit board 34 supported upon spars 35 cemented to the housing 14. Mounted upon the circuit board 34 is the latching relay 26 and an electronic amplifying and switching circuit 36, shown schematically in FIG. 3. The relay 26 includes a coil 27, an armature 29, and contacts 42a, 42b, and 42c.

Figure 3:
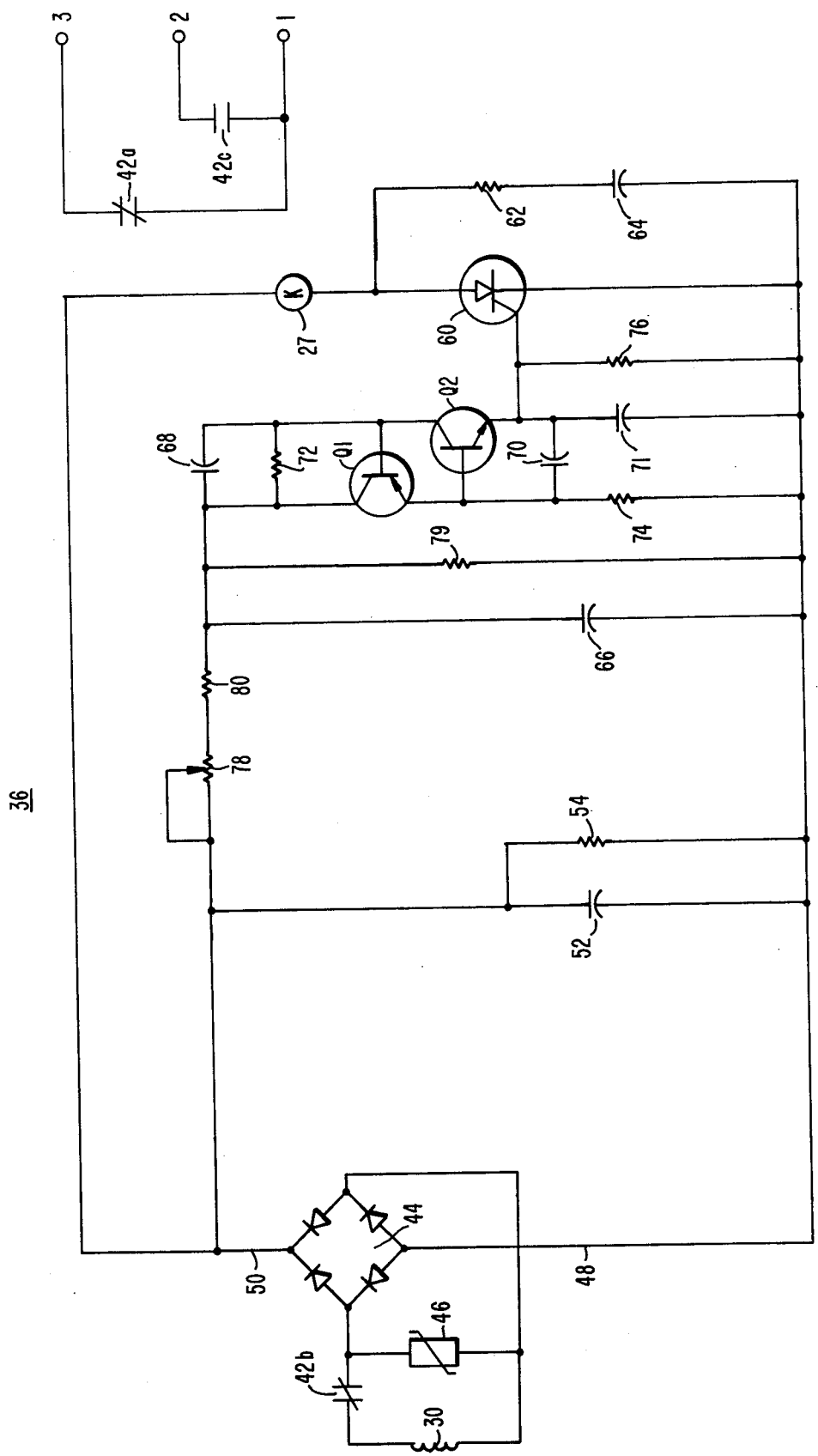
FIG. 3 is a schematic drawing of the electrical circuitry of the device shown in FIGS. 1 and 2.

Referring now to FIG. 3, the coil 30 is connected in series with contacts 42b across the input of a full wave rectifier bridge 44. Also connected across the input to the bridge 44 is a metal oxide varistor 46. The metal oxide varistor 46 protects the rest of the circuit 36 against transients generated in the coil 30. The output of the bridge 44 is connected to a common lead 48 and a supply lead 50. A filter comprising capacitor 52 and resistor 54 is connected across the supply and common leads 50 and 48. Transistors Q1 and Q2 are connected as a silicon controlled rectifier to trigger the input of a switch device such as the thyristor 60. The thyristor 60 functions to switch power flowing from the supply lead 50 through the relay coil 27 to the common lead 48. A snubbing circuit comprising resistor 62 and capacitor 64 acts to limit the voltage rise across the thyristor 60 to prevent undesired transients from activating the silicon controlled rectifier 60. Transient protection and noise immunity is also provided by capacitors 66, 68, 70, 71 and resistor 72. Resistors 74 and 76 serve to maintain at ground potential the inputs of transistors Q1, Q2 and thyristor 60, respectively, during no-signal conditions. Resistors 78, 79 and 80 act as a voltage divider to set the turn-on level of Q1, thereby establishing the ground fault trip current level.

In operation, a ground fault current through the conductors 21 of the circuit surrounded by the coil 30 will produce an output signal from the coil 30 which is rectified and filtered by the bridge 44, capacitor C1, and resistor 54. The signal is amplified by transistors Q1 and Q2, the output of which causes the thyristor 60 to conduct. Current thus flows through the relay coil 27, thereby moving the armature 29 and actuating the contacts 42a -42c. Contacts 42a and 42b (normally closed) are opened, and contact 42c (normally open) is closed. When the contact 42b is opened, the power supply for circuit 36 is disconnected thereby deenergizing the circuit 36. However, since the relay 26 is a latching relay, the contacts 42a, 42b, and 42c remain in the condition brought about by the actuation of the relay 26. An associated shunt trip circuit connected across the contacts 42c will be activated, causing the associated circuit breaker to open and take appropriate action to deenergize the conductors of the circuit 21 passing through the coil 30. Actuation of the relay 26 causes the connecting rod 45 to move upward as seen in FIGS. 1 and 2, thereby extending the reset indicating button 28 above the level of the housing 12. This provides a positive indication that a ground fault has occurred on the circuit being protected. The relay 26 will remain latched in this position until the reset indicating button 28 is manually depressed. This moves the armature 29 and resets the position of the contacts 42a, 42b, and 42c to the condition shown in FIG. 3.

By combining the current monitor, amplifying circuitry, and relay in a single unitary housing, the invention eliminates the necessity to position and mount two or more devices as was necessary using separate current monitors and sensors. This also eliminates the necessity of a connection between the current monitor and sensor, thereby reducing installation costs and avoiding any possible spurious responses due to noise pickup on the connecting leads. Since the described device is self-powered, it eliminates the necessary to route, install, and connect power leads for the sensor.

The device could also be used to directly actuate a circuit breaker having a flux transfer trip mechanism or other type of low-energy tripping mechanism. A flux transfer trip mechanism employs a trip coil to selectively switch magnetic flux produced by a permanent magnet between two magnetic circuits. Such a mechanism is described more fully in U.S. Pat. No. 3,783,423 issued Jan. 1, 1974 to Alfred E. Maier and John Wafer and assigned to the assignee of the present application. In such an application, the relay would not be required. The circuit breaker trip coil would be connected in the circuit 36 in place of the relay coil 27.

It can be seen therefore that the present invention provides a ground fault protective device which is lower in cost, simpler to install, and provides improved performance over the prior art.

I claim:

1. A self-powered ground fault protective device, comprising:
   a current transformer secondary coil;
   a latching relay comprising main contacts adapted to control an associated interrupting device;
   amplifying means connected to said coil for triggering said relay;
   rectifier means connected to said secondary coil for powering said amplifying means and said relay; and
   a housing supporting and enclosing said coil, said triggering means, and said relay;
   said relay comprising auxiliary contacts connected in series with said secondary coil and said rectifier means.

2. A self-powered ground fault protective device as recited in claim 1 further comprising a reset and indicating member operatively connected to said latching relay and extendable external to said housing to indicate the position of said latching relay, manual operation of said member when said relay is in the latched position causing said member to reset said latching relay to the unlatched position.

3. A ground fault protective device, comprising:
   a current monitor adapted to surround the conductors of a circuit being protected, said monitor comprising an annular core of laminated insulated iron tape and a coil wound upon said core;
   a molded insulating housing supporting and enclosing said current monitor;
   a circuit board supported and enclosed within said housing;
   electronic circuit means mounted upon said circuit board and comprising rectifier means connected to said coil, an electronic switching device, and means powered by said rectifier means for triggering said electronic switching device upon occurrence of ground fault on the circuit being protected;
   a latching relay supported and enclosed within said housing and comprising a relay coil connected in series circuit relationship with said rectifier means and said electronic switching device, control contacts adapted to control an associated circuit interrupter device, normally closed auxiliary contacts electrically connected to said current monitor coil and operable upon actuation of said ground fault protective device to deenergize said electronic circuit means, said contacts being operable in response to energization of said relay coil to move from an unactivated position to an activated latched position; and
   a reset and indicating button operatively connected to said latching relay and extendable external to said housing, said button operable upon movement of said contacts to the activated latched position to externally extend from said housing and visually indicate the position of said contacts, manual operation of said button being operable to move said contacts to an unactivated position;
   a ground fault condition upon the conductors enclosed by said current monitor causing said current monitor coil to produce an output signal, said signal causing said triggering means to close said electronic switching device and energize said relay coil, thereby moving said contacts to the activated position and causing said auxiliary contacts to de-energize said electronic circuit means.

4. A ground fault protective device, comprising:

a current monitor having an annular core and a secondary coil would around said core;

a ground fault sensor comprising a latching relay having main contacts for tripping an associated circuit interrupter and auxilliary contacts connected in series with said secondary coil and rectifier means, amplifying means for triggering said relay, said rectifier means being connected to said secondary coil for powering said relay and said amplifying means, said sensor being operable upon receiving a signal from said current monitor to actuate said relay; and an apertured housing supporting and enclosing said current monitor and said ground fault sensor, the aperture of said housing extending through said core and surrounding conductors of an associated electrical circuit being protected so that ground fault current through the conductors of the associated circuit above a predetermined level will produce an output signal from said current monitor, thereby operating said ground fault sensor and actuating said output terminals.

* * * * *